(12) United States Patent
Hatry

(10) Patent No.: US 11,364,169 B2
(45) Date of Patent: Jun. 21, 2022

(54) METHOD OF PREPARING A LIKENESS OF A DECEASED HUMAN OR ANIMAL

(71) Applicant: Heide Hatry, Heidelberg (DE)

(72) Inventor: Heide Hatry, Heidelberg (DE)

( * ) Notice: Subject to any disclaimer, the term of this patent is extended or adjusted under 35 U.S.C. 154(b) by 0 days.

(21) Appl. No.: 17/247,893

(22) Filed: Dec. 29, 2020

(65) Prior Publication Data

US 2021/0113409 A1 Apr. 22, 2021

Related U.S. Application Data

(63) Continuation-in-part of application No. 16/577,030, filed on Sep. 20, 2019, now Pat. No. 10,905,616.

(60) Provisional application No. 62/734,638, filed on Sep. 21, 2018.

(51) Int. Cl.
| | | |
|---|---|---|
| *A61G 17/00* | (2006.01) | |
| *C09J 189/00* | (2006.01) | |
| *B33Y 10/00* | (2015.01) | |
| *B33Y 80/00* | (2015.01) | |
| *B29C 64/30* | (2017.01) | |
| *B33Y 40/20* | (2020.01) | |
| *A61G 17/08* | (2006.01) | |

(52) U.S. Cl.
CPC ............. *A61G 17/00* (2013.01); *A61G 17/08* (2013.01); *B29C 64/30* (2017.08); *B33Y 10/00* (2014.12); *B33Y 40/20* (2020.01); *B33Y 80/00* (2014.12); *C09J 189/00* (2013.01); *B29C 2795/007* (2013.01)

(58) Field of Classification Search
CPC ........ A61G 17/00; A61G 17/08; A61G 99/00; B44D 3/18; B44D 5/00; E04H 13/008; B44C 5/00; B29C 64/30; B29C 2795/007; B33Y 10/00; B33Y 80/00; B33Y 40/20; C09J 189/00
USPC ...................... 27/1; 428/542.4; 427/258, 262
See application file for complete search history.

(56) References Cited

U.S. PATENT DOCUMENTS

| | | |
|---|---|---|
| 232,782 A | 9/1880 | Townsend |
| 1,640,680 A | 8/1927 | Albert |
| 5,016,330 A | 5/1991 | Botsch |
| 6,023,822 A | 2/2000 | Luebke |
| 6,170,136 B1 | 1/2001 | Wilson-Brokl |
| 6,200,507 B1 | 3/2001 | Dennis |
| 6,382,111 B1 | 5/2002 | Hojaji |
| 6,615,463 B1 | 9/2003 | Hojaji |
| 6,665,916 B1 | 12/2003 | Santorello et al. |
| 6,785,938 B1 | 9/2004 | Johansen, Jr. |
| 7,266,866 B2 | 9/2007 | Vogel et al. |
| 7,526,844 B2 | 5/2009 | Pearce |
| 8,627,555 B2 | 1/2014 | Kennedy |
| 9,168,573 B2 | 10/2015 | Hojaji |
| 9,393,170 B2 * | 7/2016 | Savage ................. A44C 27/00 |
| 9,610,207 B1 | 4/2017 | Fort |
| 9,700,923 B2 | 7/2017 | Camps |
| 9,801,433 B2 * | 10/2017 | Murphy ............... A44C 9/0053 |

(Continued)

*Primary Examiner* — William L Miller
(74) *Attorney, Agent, or Firm* — MG Miller Intellectual Property Law LLC

(57) ABSTRACT

A method for preparing a likeness of a deceased human or animal, incorporating said human or animal's cremains in the likeness, prepared on a surface, is disclosed. The method allows for a surface to be prepared with at least one layer of adhesive, to which the cremains are attached to create a substantially surface, which is used to prepare the likeness.

19 Claims, 1 Drawing Sheet

(56) References Cited

U.S. PATENT DOCUMENTS

| | | | | |
|---|---|---|---|---|
| 10,463,559 | B1* | 11/2019 | Stokman | C03B 25/04 |
| 10,688,006 | B2 | 6/2020 | Seltzer | |
| 11,051,591 | B2* | 7/2021 | Jackson | A44C 25/002 |
| 11,135,696 | B1* | 10/2021 | Yenawine | B24B 7/241 |
| 2001/0056309 | A1 | 12/2001 | Jain et al. | |
| 2002/0025392 | A1 | 2/2002 | Yardley et al. | |
| 2003/0154581 | A1 | 8/2003 | Jain et al. | |
| 2003/0221299 | A1 | 12/2003 | Santorello et al. | |
| 2008/0209945 | A1* | 9/2008 | Blevins | B44F 1/066 65/42 |
| 2009/0077779 | A1 | 3/2009 | Zimmerman et al. | |
| 2015/0209211 | A1* | 7/2015 | Savage | A61G 99/00 27/1 |
| 2020/0383861 | A1* | 12/2020 | Storts | C04B 28/02 |

\* cited by examiner

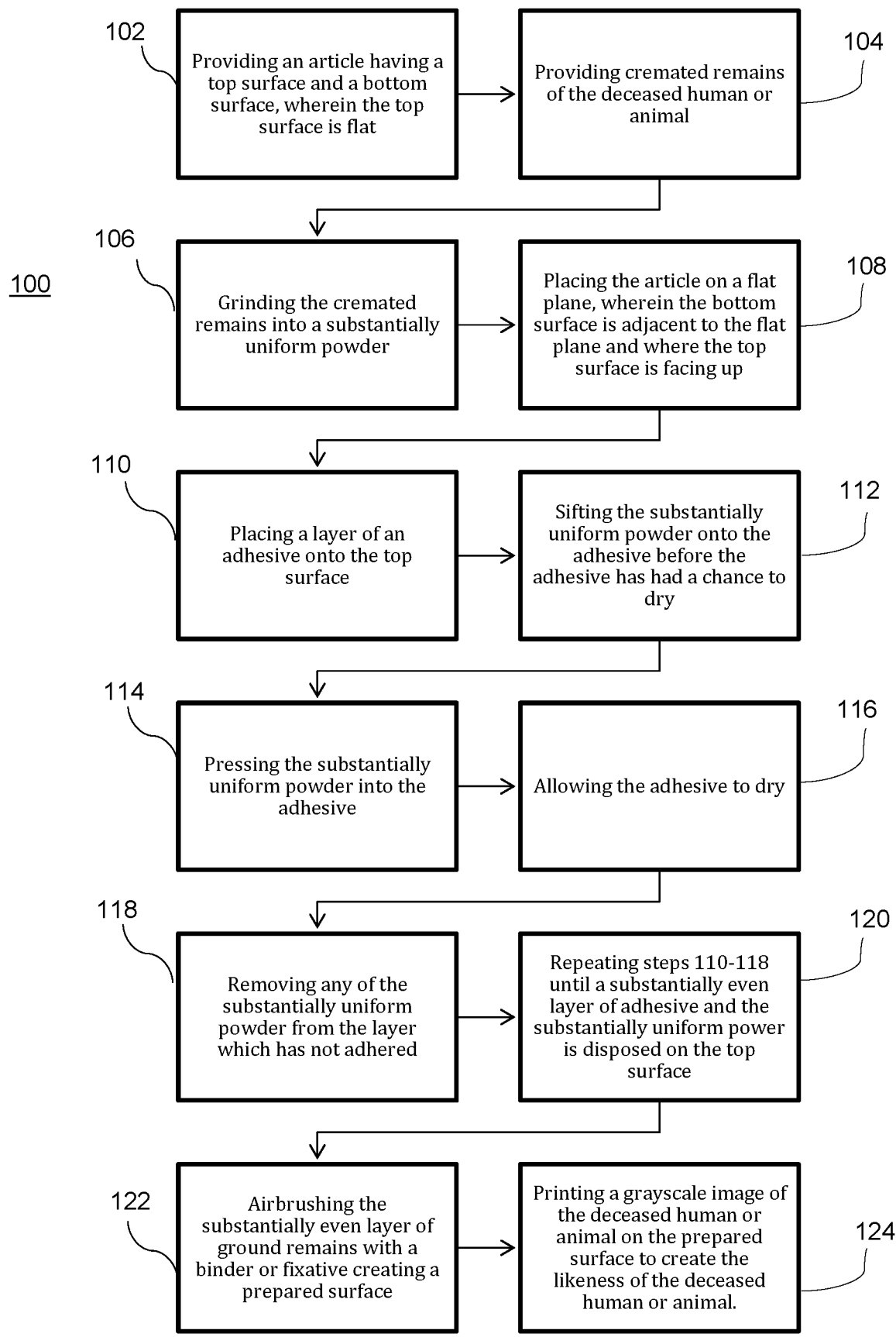

METHOD OF PREPARING A LIKENESS OF A DECEASED HUMAN OR ANIMAL

CLAIM OF PRIORITY

This application is a continuation-in-part of U.S. patent application Ser. No. 16/577,030 entitled "METHOD OF PREPARING A LIKENESS OF A DECEASED HUMAN OR ANIMAL" filed on Sep. 20, 2019, which claims priority to U.S. Provisional Patent Application No. 62/734,638 entitled "METHOD OF PREPARING A LIKENESS OF A DECEASED HUMAN OR ANIMAL" filed on Sep. 21, 2018, the contents of both of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The field of the present invention and its embodiments relate to a method of preparing a likeness of a deceased human or animal. More particularly, the present disclosure relates to a method of preparing a likeness of a deceased human or animal using the cremains of said human or animal.

BACKGROUND

Losing a friend or family member can be one of the most difficult misfortunes anyone can go through. During these emotionally challenging times, many people often find themselves struggling to cope with the passing of a loved one. Memorializing the dearly departed is an important part of the grieving process and up until now, the methods for honoring our loved ones has stayed the same. Prior to the $20^{th}$ century, people were aware of the consoling power of the deceased's body. Practices included using the dead body or parts thereof to create memorials, post-mortem photographs, jewelry, shrines, and chapels. Examples of this include sculptures made of bone, and pictures made, at least partially, of hair. While these methods existed, many of them are archaic and not used anymore. Therefore they can't offer the same comfort today that they once did. Today, there is an abundance of memorial artwork and keepsakes that people use to remember their loved ones. However, these pieces are impersonal, produced mechanically and have no artistic value, which often leave the grieving parties dissatisfied.

Nevertheless, within the past century, the rate of deceased people being cremated has increased from roughly 30% to roughly 70%. This results in there being an abundance of ashes, which are occasionally placed in urns with little-to-no connection with the deceased. Further, many of these urns are very low quality, and border on being kitschy. Making things even worse, the vast majority of people have the cremains of their loved ones scattered, leaving nothing behind to remember the deceased.

This abundance of cremains and lack of options for people to turn those cremains into a memorable, dignified artistic remembrance presents an opportunity. As such, there is a need for a way for people to have a portrait of their deceased love one which is partially comprised of the cremains of said loved one, in a way that does not require an inordinate amount of time, making such a portrait widely available. This type of tribute provides the benefit of evoking fond emotions due to the quality and beauty of the work, provides an homage to the roots of memorialization, and provides a genuine relic of the deceased for the loved ones to enjoy in perpetuity.

While these articles may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

An aspect of an example embodiment in the present disclosure is to provide a method for preparing a likeness of a deceased person or animal.

Accordingly, the present disclosure describes a method of preparing a likeness of a deceased human or animal. In a preferred embodiment, the method begins by providing an article having a top surface and a bottom surface, where the top surface is either flat or uneven, along with the cremated remains of the deceased human or animal. These cremated remains, or cremains, are ground into substantially uniform particles, if not already in that state. From there, the article is placed on a flat plane, with the top surface facing up.

A layer of an adhesive is then placed onto the top surface, and while that layer of adhesive is still wet sifting all or a portion of the substantially uniform particle onto said layer. From there the particles are pressed, either by hand or with the aid of a device, into the layer of adhesive and then the adhesive is allowed to dry. Any excess of the substantially uniform particles is then either shaken or otherwise removed from the article, the excess being defined by whatever did not adhere to the layer of adhesive.

The process of adding a layer of adhesive and then the ground cremains, pressing the ground cremains into said layer, and then allowing said layer to dry is continued until a substantially uniform surface is created on the article, constructed out of at least one, but preferably multiple layers, of ground cremains and adhesive. Then, the method proceeds to where this substantially uniform surface is airbrushed with a binder or fixative to create a prepared surface. A grayscale image of the deceased human or animal is printed onto the prepared surface to create the likeness of the deceased human or animal.

In a highly preferred embodiment, the article is rigid, preferably made of wood. However, in other embodiments, the article is flexible, such as a canvas. In some embodiments, the article is covered with an additional material, like a 3D relief print with polyamide, alumide, or others. In a different embodiment the cremains could also be printed directly on the flat surface.

In some embodiments, the adhesive is mixed with sand, or a portion of the cremains, prior to being incorporated in the method in accordance with the present disclosure.

In various embodiments, at least one dye is added to the adhesive prior to be placed on the top surface, and in other embodiments the top surface is painted prior to the method in accordance with the present disclosure being performed.

Preferably the likeness prepared by the method in accordance with the present disclosure is placed in a shadow box. In some embodiments, the portrait on the wooden board is placed in the back of the shadow box, allowing a viewer to only see the portrait. In a preferred embodiment when the effect and size of the art work is wished to be emphasized, the wooden board in the back is covered with a black cloth, on which first a spacer and then the portrait is connected with glue and screws or otherwise, resulting in the likeness appearing to float. This has the added benefit of the shadow box not need to be an exact size, giving the user greater flexibility in preparing the final likeness.

In a highly preferred embodiments, the method uses 3D printing techniques to add depth. In those embodiments, the method begins by providing an image of the deceased human or animal and uses a computer to transform the image into a digital 3D image. Then, an article with a flat top and bottom surface is provided, as well as the cremated remains of the deceased human or animal. These cremains are then ground into substantially uniform particles. The article is then placed on a flat plane with the flat top facing up. The 3D image is then printed onto the top surface to create a relief-style image, and is then subsequently covered with an adhesive. While the adhesive is still wet, the substantially uniform particles are sifted onto the adhesive, which is then allowed to dry.

Any of the particles which have not attached to the adhesive are then removed, and the steps of adding the adhesive, the particles, and allowing the adhesive to dry are repeated until a substantially even layer is disposed on the relief-style surface. A binder or fixative is then airbrushed on this substantially even layer, creating a prepared surface. An image of the deceased human or animal is then transferred to the prepared surface to create the likeness of the deceased human or animal. In some embodiments it's not necessary to transfer a likeness to the prepared surface, because the likeness is already achieved by the 3D printing. In some embodiments it might be necessary to enhance the relief in painting shadows on the relief. In some embodiments, the cremains are pressed into the adhesive, but this is not required.

In other embodiments, a different style of 3D printing is used to create the likeness of the deceased human or individual. In these embodiments, the method begins by providing an image of the deceased human or animal and transforming that image into a digital 3D Lithophane image. An article with a top surface which is flat, and the cremains of the deceased human or animal are provided. The cremains are ground into substantially uniform particles. The article is then placed on a flat plane, where the bottom surface is adjacent to the flat plane and where the top surface is facing up. The digital 3D Lithophane image is then 3D printed vertically onto the top surface, where the bright areas are printed with less material, and the dark areas are printed with more material to create a 3D printed relief that has a different thickness throughout the relief. A layer of adhesive is then placed onto the 3D printed relief, and the substantially uniform particles are sifted onto the adhesive before the adhesive has had a chance to dry. The adhesive is then allowed to dry, and any unbound particles are removed from the article. The deposited cremains are then airbrushed with a binder or fixative.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

FIG. 1 is a flow chart showing an exemplary embodiment of a method of preparing a likeness of a deceased human or animal in accordance with the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

FIG. 1 illustrates an exemplary embodiment of the method of preparing a likeness of a deceased human or animal, in the form of a flow chart. Here, the method 100 beings with step 102 where an article with a top surface and a bottom is provided, where the top surface is flat or substantially flat. The article may be something rigid such as a piece of wood, or the article may be something flexible such as an artist's canvas. Additionally, the article may be porous, although non-porous articles are used in some embodiments of the method 100. In step 104 the method provides for the cremated remains or cremains of a deceased human or animal. The cremains may be that of a human or animal as many people feel strong attachments to deceased pets as well as deceased humans, as the method can be used for any cremains.

In step 106, the cremated remains or cremains are ground into substantially uniform particles. The article is placed on a flat plane, where the bottom surface is adjacent to the flat plane such that the top surface is facing up in step 108. Proceeding to step 110, a layer of an adhesive is placed on the top surface. Then, in step 112, the ground cremains are placed on the layer of adhesive, while the adhesive is still wet, and a plurality of granular particles is placed on the top surface. This adhesive is preferably a heavy acrylic binder but can be other types of binders and adhesives as well. The adhesive can also be wax, preferably bees wax, which has to be heated so that it is fluid. Also, other heatable glues can be used. In a highly preferred embodiment, the adhesive is egg tempera.

The ground cremains from step 106 can be supplemented with sand or crumbled marble particles if the amount of available cremains is limited. This can be done via a mortar and pestle and can also be subsequently sifted to remove any large chunks of cremains as well as dust that is too fine. Preferably, the grinding is performed using a burr grinder to ensure that the granules generated by the grinding are in a substantially consistent particle size. In alternative embodiments, this mixture is dyed with paint, illuminated with UV light, or is lightened by soaking the particles in hydrogen peroxide and then subsequently drying said particles. When the particles were mixed with paint they might have to be disconnected again (for example, with mortar and pestle), and all treated particles need to be sifted again before the method continues.

The method then proceeds to step 114 where the ground cremains are pressed into the layer of adhesive and the adhesive is allowed to dry in step 116. The amount of time this will take will depend on the temperature and humidity of the ambient environment, as well as the chemical composition of the adhesive and the cremains. In step 118, after the adhesive has dried, any excess ground cremains are removed from the top surface. Step 120 calls for the repetition of steps 110-118 until the top surface is coated with a substantially even layer of ground cremains and adhesive, usually requiring 2-4 repetitions.

In step 122, the article is airbrushed or pressure pumped with a binder or fixative creating a prepared surface. In many preferred embodiments, this binder or fixative is Workable Fixatif, produced by Krylon® Products Group, a subsidiary of Sherwin-Williams® Company. In an exemplary embodiment, the fixative used is a mixture Dispersion K498, with 10% of the matting agent being Acematt HK125-flakes, which is amorphous silica to avoid having a glossy finish. Note that the binder or fixative desirably is both substantially transparent and matte. In step 124 a grayscale image of the deceased human or animal is printed on the prepared surface to create a likeness of said deceased human or animal. In various embodiments, a color image of the deceased human or animal is printed on the prepared surface. This printing is done preferably by a flatbed ink printer with a double strike black ink. Alternatively, this printing can be done through silkscreen transfer, or other methods of transfer.

In other embodiments, the surface is covered with a light-sensitive emulsion, which can be developed as a photograph under an enlarger in a darkroom. Afterwards the developer and fixatif are painted onto the surface. The image can also be transferred onto the surface, buy using a solvent for the ink of a standard photocopy. In some embodiments, for example if the client doesn't want to see the actually ash particles, or if the likeness is achieved by painting or airbrushing the portrait onto the surface by an artist, the surface is preferably prepared with smaller, rather dust-like particles of the cremated remains mixed with a binder to create an entirely smooth surface, like plaster. This surface can be prepared exactly in the tone that is desired, because pigments can be added into the mixture. The surface is then preferably further smoothened with a trowel or squeegee. In various embodiments, the method comprises the additional step of airbrushing the likeness with a varnish to keep everything in place. Preferably, the varnish is both matte and substantially transparent.

In some embodiments, the likeness of the human or animal is created in a "relief" format. That is, an uneven surface may be used to create a likeness of a deceased human or individual which has some depth. In these embodiments, a 2 dimensional image of the deceased is transformed into a pseudo-3D image and then 3D printed onto the surface, which is then used with other steps of the method in accordance with the present disclosure to create a likeness of the deceased which is shown in relief form. That is, the likeness which is shown in three dimensions. In this embodiment, adding the layers of ashes could be either the end of the process, (if the person is already recognizable because of the 3D shape, or it can be achieved afterwards in enhancing the effect by painting or airbrushing.

In a preferred embodiment, the likeness is housed within a shadowbox, preferably with a glare free museum glass in the front, which acts as a preserving mechanism as well as is an attractive way to house the likeness. The present disclosure also teaches the finished likeness of a deceased person or animal including their cremains in addition to the method of creating said likeness.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the FIGURES. It is understood that the spatially relative terms are intended to encompass different orientations of the device in use or operation in addition to the orientation depicted in the FIGURES. For example, if the device in the FIGURES is turned over, elements described as "below," or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a method of preparing a likeness of a deceased human or animal. The disclosure is illustrated by example in the drawing FIGURES, and throughout the written description. It should be understood that numerous variations are possible while adhering to the inventive concept. Such variations are contemplated as being a part of the present disclosure.

What is claimed is:

1. A method of preparing a likeness of a deceased human or animal, comprising the steps of:
   a. providing an article having a top surface and a bottom surface, wherein the top surface is flat;
   b. providing cremated remains of the deceased human or animal;
   c. grinding the cremated remains into substantially uniform particles;
   d. placing the article on a flat plane, wherein the bottom surface is adjacent to the flat plane and where the top surface is facing up;
   e. placing a layer of an adhesive onto the top surface;
   f. sifting the substantially uniform particles onto the adhesive before the adhesive has had a chance to dry;
   g. pressing the substantially uniform particles into the adhesive;
   h. allowing the adhesive to dry;
   i. removing any of the substantially uniform particles from the layer which has not adhered;
   j. repeating steps e-i until a substantially even layer of adhesive and the substantially uniform particles are disposed on the top surface to create a substantially uniform surface;
   k. airbrushing the substantially uniform surface with a binder or fixative creating a prepared surface; and
   l. printing a grayscale image of the deceased human or animal on the prepared surface to create the likeness of the deceased human or animal.

2. The method of claim 1, wherein the article is rigid.

3. The method of claim 2, wherein the article is a wooden board.

4. The method of claim 1, wherein the article is flexible.

5. The method of claim 4, wherein the article is canvas.

6. The method of claim 1, wherein the adhesive is mixed with sand.

7. The method of claim 1, wherein the adhesive is mixed with a portion of the cremated remains.

8. The method of claim 1, wherein the adhesive is pure and not mixed with anything.

9. The method of claim 1, further comprising the step of mixing the adhesive and the plurality of substantially uniform particles with at least one dye.

10. The method of claim 1, further comprising the step of initially treating the top surface with at least one layer of paint.

11. The method of claim 1, wherein the adhesive is egg tempera.

12. The method of claim 1, wherein the fixative is a reworkable clear finish.

13. The method of claim 1, further comprising placing the likeness of the deceased human or animal in a shadowbox.

14. The method of claim 1, wherein the step of printing a grayscale image of the deceased human or animal on the prepared surface to create the likeness of the deceased human or animal is performed via a flatbed printer.

15. The method of claim 14, wherein the step of printing a grayscale image of the deceased human or animal on the prepared surface to create the likeness of the deceased human or animal is performed twice.

16. A method of preparing a likeness of a deceased human or animal, comprising the steps of:
   a. providing an image of the deceased human or animal;
   b. using a computer to transform said image into a digital 3D image;
   c. providing an article having a top surface and a bottom surface, wherein the top surface is flat;
   d. providing cremated remains of the deceased human or animal;
   e. grinding the cremated remains into substantially uniform particles;
   f. placing the article on a flat plane, wherein the bottom surface is adjacent to the flat plane and where the top surface is facing up;
   g. 3D printing the image onto the top surface to create a 3D printed relief;
   h. placing a layer of an adhesive onto the 3D printed relief;
   i. sifting the substantially uniform particles onto the adhesive before the adhesive has had a chance to dry;
   j. allowing the adhesive to dry;
   k. removing any of the substantially uniform particles from the layer which has not adhered;

l. repeating steps e-i until a substantially even layer of adhesive and the substantially uniform particles are disposed on the 3D printed relief;

m. airbrushing the substantially even layer of adhesive and substantially uniform particles on the 3D printed relief with a binder or fixative creating a prepared surface; and n. transferring the provided image of the deceased human or animal onto the prepared surface to create the likeness of the deceased human or animal.

17. The method of claim 16, wherein step i is followed by: pressing the substantially uniform particles into the adhesive.

18. A method of preparing a likeness of a deceased human or animal, comprising the steps of:

a. providing an image of the deceased human or animal;

b. transforming the image into a digital 3D Lithophane image;

c. providing an article having a top surface and a bottom surface, wherein the top surface is flat;

d. providing cremated remains of the deceased human or animal;

e. grinding the cremated remains into substantially uniform particles;

f. placing the article on a flat plane, wherein the bottom surface is adjacent to the flat plane and where the top surface is facing up;

g. 3D printing the digital 3D Lithophane image onto the top surface, where the bright areas are printed with a small amount of material, and the dark areas are printed with a large amount of material to create a 3D printed relief;

h. removing the 3D printed relief from the top surface;

i. placing a layer of an adhesive onto the 3D printed relief;

j. sifting the substantially uniform particles onto the adhesive before the adhesive has had a chance to dry;

k. allowing the adhesive to dry;

l. removing any of the substantially uniform particles from the layer which has not adhered to create a substantially even layer of adhesive and substantially uniform particles on the 3D printed relief; and m. airbrushing the substantially even layer of adhesive and substantially uniform particles on the 3D printed relief with a binder or fixative creating a prepared surface.

19. The method of claim 18, further comprising the step of:

n. repeating steps h-k until a substantially and even layer of adhesive and the substantially uniform particles are disposed on the top surface.

* * * * *